(12) United States Patent
Stjernberg et al.

(10) Patent No.: US 12,384,339 B2
(45) Date of Patent: Aug. 12, 2025

(54) HEAVY-DUTY VEHICLE

(71) Applicant: VOLVO TRUCK CORPORATION, Gothenburg (SE)

(72) Inventors: Oscar Stjernberg, Gothenburg (SE); Martin Wilhelmsson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 112 days.

(21) Appl. No.: 18/499,711

(22) Filed: Nov. 1, 2023

(65) Prior Publication Data
US 2024/0157919 A1 May 16, 2024

(30) Foreign Application Priority Data
Nov. 11, 2022 (EP) .................................. 22207071

(51) Int. Cl.
*B60T 8/24* (2006.01)
*B60T 8/172* (2006.01)

(52) U.S. Cl.
CPC .............. *B60T 8/245* (2013.01); *B60T 8/172* (2013.01); *B60T 2210/20* (2013.01)

(58) Field of Classification Search
CPC ...... B60T 8/245; B60T 8/172; B60T 2210/20; B60T 8/1708
See application file for complete search history.

(56) References Cited

U.S. PATENT DOCUMENTS

| 2012/0253617 A1 | 10/2012 | Halleberg et al. |
| 2018/0066753 A1 | 3/2018 | Zhao et al. |
| 2022/0185460 A1* | 6/2022 | Miller .................. B60T 17/221 |
| 2022/0212664 A1 | 7/2022 | Bora et al. |

FOREIGN PATENT DOCUMENTS

| DE | 102020001387 A1 | 10/2020 |
| WO | 2022106004 A1 | 5/2022 |
| WO | 2022194357 A1 | 9/2022 |

OTHER PUBLICATIONS

Extended European Search Report in corresponding European Application No. 22207071.6 dated Apr. 4, 2023 (8 pages).

* cited by examiner

*Primary Examiner* — Lindsay M Low
*Assistant Examiner* — Charles J Brauch
(74) *Attorney, Agent, or Firm* — Venable LLP; Jeffri A. Kaminski

(57) ABSTRACT

A heavy-duty vehicle has a first set of metallic brakes and a second set of non-metallic brakes having lower weight than the metallic brakes. A processor device is configured to acquire prediction data indicative of an upcoming brake event that is expected to occur along a road on which the vehicle is travelling; determine, based on the prediction data, an expected value of kinetic energy that will be absorbed during said upcoming brake event; select, based on said determined expected value of kinetic energy, which one of the first and second sets of brakes that is to be activated to absorb kinetic energy during said upcoming brake event; and control the selected set of brakes to be activated during said brake event, wherein the other set of brakes remains inactivated during said brake event.

15 Claims, 5 Drawing Sheets

HEAVY-DUTY VEHICLE

TECHNICAL FIELD

The disclosure relates generally to a heavy-duty vehicle. In particular aspects, the disclosure relates to controlling the brakes of a heavy-duty vehicle. The disclosure can be applied in various types of heavy-duty vehicles, such as trucks, buses, and construction equipment. Although the disclosure may be described with respect to a particular vehicle, the disclosure is not restricted to any particular vehicle.

BACKGROUND

In order to save energy and increase range for heavy-duty vehicles, a key component is to save weight. For instance, on a truck, the service brake systems are very heavy and are a vital component in order to operate the truck safely. The brakes are often of metallic material, such as steel. To save weight, light-weight options in the form of carbon brakes have been developed. Carbon brakes are much lighter than steel brakes, and thus may save energy and increases range. However, carbon brakes tend to wear quickly. The wear of carbon brakes is primarily dependent on the total number of brake events. One firm and long brake event causes less wear to the carbon brakes than several light applications. There is thus still room for improvement when it comes to braking of heavy-duty vehicles.

SUMMARY

According to a first aspect of the disclosure, there is provided a heavy-duty vehicle, comprising:
a first set of brakes,
a second set of brakes,
wherein the brakes of the first set are metallic brakes,
wherein the brakes of the second set are non-metallic brakes, wherein each non-metallic brake of the second set has a lower weight than each metallic brake of the first set, a processor device which is configured to:
acquire prediction data indicative of an upcoming brake event that is expected to occur along a road on which the vehicle is travelling,
determine, based on the prediction data, an expected value of kinetic energy that will be absorbed during said upcoming brake event,
select, based on said determined expected value of kinetic energy, which one of the first and second sets of brakes that is to be activated to absorb kinetic energy during said upcoming brake event, and
control the selected set of brakes to be activated during said brake event, wherein the other set of brakes remains inactivated during said brake event.

The first aspect of the disclosure may seek to both reduce the weight compared to vehicles having only traditional steel brakes, while also reducing the wear of the brakes based on appropriate brake control. A technical benefit may include that, by providing some non-metallic brakes (which are lighter than metallic brakes), the weight can be reduced, and by selectively controlling which ones of the metallic or non-metallic brakes that are applied for an upcoming brake event, the wear of the different brakes may also be reduced compared to if braking is performed without taking into account the nature of the upcoming brake event.

The general inventive concept is based on the insight that weight reduction and wear reduction can be appropriately balanced by providing two types of brakes and selectively applying one of the types depending on the current situation. In particular, it has been realized that the wear of non-metallic (for example carbon brakes) can be reduced by predicting the intensity of upcoming brake events. If it is predicted that a large amount of kinetic energy will need to be absorbed (for example, driving downhill) then the non-metallic brakes may advantageously be used, whereas if a short brake event where little energy needs to be absorbed is predicted, then the metallic brakes may be used instead (unless it is necessary to also supplement with the application of the non-metallic brakes, for instance, to avoid an accident). A further benefit with the above examples is that the wear of metallic brakes (such as steal brakes) is generally directly proportional to the kinetic energy that they absorb. By letting the non-metallic brakes absorb the kinetic energy during long brake events, the service life for the metallic brakes can be extended, since they should advantageously be used for a large number of small, light brake events, allowing cooling between the brake events.

In some examples, the metallic brakes are steel brakes, wherein the non-metallic brakes are carbon brakes. A technical benefit may include that both steel brakes and carbon brakes are readily available, and thus there is no need to develop a new type of brake for implementing the control strategy of the present disclosure. In some examples the carbon brakes may be carbon/ceramic brakes or carbon/carbon brakes. In some examples, the brake disks of the carbon brakes, may be carbon based. In some examples, both the brake pads and the brake disks may be carbon based.

In some examples, the first set of brakes are provided on a first set of wheels, wherein the second set of brakes are provided on a second set of wheels. A technical benefit may include that a set of wheels that may be preferred for braking in a certain brake event may be matched with the set of brakes that may be preferred for the same brake event. For instance, in a downhill slope, the center of gravity imposes more load upon front wheels than rear wheels, and may overload the frictional grip between the front wheel tires and the road. Therefore, to reduce the risk of skidding, it may be advantageous to apply the brakes on the rear wheels. As explained previously, it may be advantageous to apply the non-metallic brakes in a long downhill slope. Accordingly, in some examples, the first set of brakes (metallic) may suitably be provided on front wheels, while the second set of brakes (non-metallic) may suitably be provided on rear wheels.

In some examples, the processor device is configured to compare said determined expected value of kinetic energy with a predetermined energy threshold value, wherein upon determination by the processor device that said determined expected value is higher than the predetermined energy threshold value, then the processor device selects the second set of brakes, and upon determination by the processor device that said determined expected value is lower than the predetermined energy threshold value then the processor device selects the first set of brakes. A technical benefit may include that this provides for an effective way of controlling the brakes. Thus, the second set of brakes (non-metallic) may be engaged if the expected value of kinetic energy is higher than the predetermined energy threshold value, which may, for instance, be the case in a long and/or steep downhill slope. The setting of the predetermined energy threshold value may suitably be set based on calculations, empirical studies, etc. The setting of the predetermined energy threshold may suitably be set so as to provide an adequate balance between the wear of the first set of brakes and the wear of the second set of brakes. Therefore, since vehicles may be travelling on different types of routes, presenting different magnitudes of braking energy requirements, the setting of the threshold value may be made in connection with the route planning, so as to obtain a balanced wear of the first and second sets of brakes. When setting the threshold value in connection with route planning, account may be taken of the number of expected brake events as well as the expected value of kinetic energy of each brake event. The setting of the threshold value may be achieved by the processor device itself as part of the route planning, or it may be made by a different device which in its turn provides the set threshold value to the processor device.

In some examples, said prediction data comprises stored historical driving data representing previous brake actions, wherein the processor device is configured to access said stored historical data, and based on said stored historical data, determine said expected value of kinetic energy that will be absorbed during said upcoming brake event. A technical benefit may include that using historical data may improve the accuracy in determining the expected value of the kinetic energy and thus improving the selecting and controlling of the brakes. Since a heavy-duty vehicle is often used for transporting goods or passengers along the same route, the actual brake energy that has been applied historically at different locations along the route may suitably be stored, and may later be used when the vehicle again approaches said locations and the processor device selects and controls which set of brakes to apply. The processor device may suitably be configured to perform its own calculations/estimations based on the historical data. For instance, if the historical data includes a number of travels along the same road, with different weights of carried loads, the processor device may suitably, based on such historical data, estimate/calculate (e.g. through interpolation or extrapolation) an expected value of the kinetic energy that will be absorbed with the current load carried by the vehicle.

In some examples, said prediction data comprises information about the topography of an upcoming road segment, wherein the processor device is configured to determine said expected value of kinetic energy based on said information about the topography. A technical benefit may include that use may, for example, be made of a geographic information system (GIS) of the vehicle, such as a Global Positioning System (GPS) or the like. The topographic information may include information about upcoming downhill slopes, for which a brake event is expected to be needed. However, the topographic information may also include other topographic items which may be relevant for braking. For example, the topographic information may include upcoming curves. For a heavy curve, the processor device may determine that a brake event will be initiated when driving through the curve or before entering the curve.

In some examples, said information about the topography comprises information about a length and/or a grade of an upcoming downhill slope. A technical benefit may include that by having the length and/or grade the kinetic energy may be estimated/calculated. In particular, if the total weight of the vehicle is known, and the grade of the downhill slope is known, a brake power determination may be based on the well-known formula for an inclined plane: $a = m \cdot g \cdot \sin(\theta)$, where a is the acceleration, m is the vehicle mass, g is the gravity of Earth, and the angle $\theta$ is the grade of the downhill slope. Thus, in order to avoid acceleration and to maintain a current cruising speed in the downhill slope, the braking force should suitably balance the acceleration force (and thus the braking power can be roughly estimated to the acceleration times the vehicle speed; but it may also be appropriate to including in the estimation/calculation any other power-affecting factors such as rolling resistance and aero resistance, for improved accuracy). By additionally having information about the length and the cruising speed, the time it takes to travel along the downhill slope can be determined, and thereby the braking energy (as braking power multiplied by the time). Thus, from the above, it can be understood that various input parameters may be used by the processor device for determining an expected value of the kinetic energy, be it based on estimation or calculation, or in any other suitable way. This is at least partly reflected below.

In some examples, the processor device is configured to determine said expected value of kinetic energy based on one or more of the following parameters:
  an expected time duration of the upcoming brake event,
  an expected distance that will be travelled by the vehicle during the upcoming brake event,
  a grade of the road segment at which the upcoming brake event is expected to occur,
  the current vehicle speed.

As already understood from the previous discussion, using one of more of these parameters allow the processor device to make a determination of an expected value of kinetic energy. Using several of the parameters may improve the determination.

In some examples, said determining, by the processor device, of the expected value of kinetic energy, comprises determining how much brake power that needs to be applied during the upcoming brake event to maintain the current vehicle speed. A technical benefit may include, that the processor device may base its estimation on a desired cruising speed. Thus, in a cruise control mode, the processor device may determine how much brake power that will be needed in a brake event for maintaining the cruising speed and thus, based on an expected duration of the brake event, the expected brake energy may also be determined. For instance, in cruise control mode, when approaching a downhill slope, the processor device may determine how much brake power is required to maintain the cruising speed (i.e. you only want to apply sufficient brake power to maintain the speed). Knowing the brake power that needs to be applied, and the length of the downhill slope, the processor device can also determine the expected value of kinetic energy that will be absorbed during the upcoming braking along the downhill slope.

In some examples, said upcoming brake event is a first brake event, wherein the said prediction data is also indicative of a plurality of subsequent brake events that are expected to occur along a road on which the vehicle is travelling, wherein the processor device is configured to:
  determine, based on the prediction data, for each one of said plurality of subsequent brake events, a respective expected value of kinetic energy that will be absorbed during that subsequent brake event,
  select for each one of said subsequent brake events, based on said determined respective expected value of kinetic energy, which one of the first and second sets of brakes that is to be activated to absorb kinetic energy during that subsequent brake event, and
  control the selected set of brakes to be activated during that subsequent brake event, wherein the other set of brakes remains inactivated during that subsequent brake event. A technical benefit may include that, by having a plurality of brake events as part of the "look-ahead" information provided by the prediction data, the processor device may in advance determine a suitable selection of which brakes to actuate for which events. Hereby, the processor device may balance the wear of the first and second sets of brakes with a more long term perspective than what may be the case if the selection is made for one brake event at a time.

It should be understood that in some examples, the prediction data is generated onboard the vehicle. For instance, the prediction data may be generated by a GIS of the vehicle, which is in operative communication with the processor device. However, in some examples, processor device may receive the prediction data from remotely, such as from a remote server, e.g. through telematics communication.

It should also be understood that although the present disclosure teaches that the processor device may select which set of brakes to apply in an upcoming brake event, in some examples, the driver may be allowed to manually select to use one or both sets of brakes if he/she desires.

Furthermore, it should be understood, any brake event for which the processor device determines that only actuating one of the first and second sets of brakes will not provide enough brake power, the processor device may in such scenario suitably actuate both sets of brakes.

According to a second aspect of the disclosure, there is provided a computer system comprising a processor device configured to:
  acquire prediction data indicative of an upcoming brake event that is expected to occur along a road on which a heavy-duty vehicle is travelling,
  determine, based on the prediction data, an expected value of kinetic energy that will be absorbed during said upcoming brake event,
  select, based on said determined expected value of kinetic energy, which one of a first set of brakes and a second set of brakes of the heavy-duty vehicle that is to be activated to absorb kinetic energy during said upcoming brake event, wherein the brakes of the first set are metallic brakes and the brakes of the second set are non-metallic brakes, and
  control the selected set of brakes to be activated during said brake event, wherein the other set of brakes remains inactivated during said brake event.

The second aspect of the disclosure may seek to achieve the corresponding effect as the heavy-duty vehicle of the first aspect, and may include corresponding technical benefits as the heavy-duty vehicle of the first aspect, including any example thereof.

According to a third aspect of the disclosure, there is provided a computer-implemented method, comprising:
  acquiring, by a processor device of a computer system, prediction data indicative of an upcoming brake event that is expected to occur along a road on which a heavy-duty vehicle is travelling,
  determining, by the processor device, based on the prediction data, an expected value of kinetic energy that will be absorbed during said upcoming brake event,
  selecting, by the processor device, based on said determined expected value of kinetic energy, which one of a first set of brakes and a second set of brakes of the heavy-duty vehicle that is to be activated to absorb kinetic energy during said upcoming brake event, wherein the brakes of the first set are metallic brakes and the brakes of the second set are non-metallic brakes, and
  controlling, by the processor device, the selected set of brakes to be activated during said brake event, wherein the other set of brakes remains inactivated during said brake event. The third aspect of the disclosure may seek to achieve the corresponding effect as the heavy-duty vehicle of the first aspect, and may include corresponding technical benefits as the heavy-duty vehicle of the first aspect, including any example thereof.

In the following a list of examples of the computer-implemented method of the third aspect will be presented. The effects and benefits of the listed examples are largely analogous to corresponding examples presented previously in connection with the heavy-duty vehicle of the first aspect.

In some examples, the computer-implemented method further comprises:
  comparing, by the processor device, said determined expected value of kinetic energy with a predetermined energy threshold value,
  upon determination by the processor device that said determined expected value is higher than the predetermined energy threshold value, selecting, by the processor device, the second set of brakes, and
  upon determination by the processor device that said determined expected value is lower than the predetermined energy threshold value, selecting, by the processor device, the first set of brakes.

In some examples, said prediction data comprises stored historical driving data representing previous brake actions, the computer-implemented method further comprising:
  accessing, by the processor device, said stored historical data, and
  determining, by the processor device, based on said stored historical data, said expected value of kinetic energy that will be absorbed during said upcoming brake event.

In some examples, said prediction data comprises information about the topography of an upcoming road segment, the computer-implemented method further comprising:
  determining, by the processor device, said expected value of kinetic energy based on said information about the topography.

In some examples, the computer-implemented method further comprises determining, by the processor device, said expected value of kinetic energy based on one or more of the following parameters:
  an expected time duration of the upcoming brake event,
  an expected distance that will be travelled by the vehicle during the upcoming brake event,
  a grade of the road segment at which the upcoming brake event is expected to occur,
  the current vehicle speed.

In some examples, said determining, by the processor device, of the expected value of kinetic energy, comprises:
  determining, by the processor device, how much brake power that needs to be applied during the upcoming brake event to maintain the current vehicle speed.

In some examples, said upcoming brake event is a first brake event, wherein the said prediction data is also indicative of a plurality of subsequent brake events that are expected to occur along a road on which the vehicle is travelling, the computer-implemented method further comprising:
  determining, by the processor device, based on the prediction data, for each one of said plurality of subsequent brake events, a respective expected value of kinetic energy that will be absorbed during that subsequent brake event, selecting, by the processor device, for each one of said subsequent brake events, based on said determined respective expected value of kinetic energy, which one of the first and second sets of brakes that is to be activated to absorb kinetic energy during that subsequent brake event, and controlling, by the processor device, the selected set of brakes to be activated during that subsequent brake event, wherein the other set of brakes remains inactivated during that subsequent brake event.

According to a fourth aspect of the disclosure, there is provided a computer program product comprising program code for performing, when executed by the processor device, the method of the third aspect, including any example thereof. The technical benefits of the fourth aspect may largely correspond to those of the method of the third aspect, including any example thereof.

According to a fifth aspect of the disclosure, there is provided a control system comprising one or more control units configured to perform the method of the third aspect, including any example thereof. The technical benefits of the fifth aspect may largely correspond to those of the method of the third aspect, including any example thereof.

According to a sixth aspect of the disclosure, there is provided a non-transitory computer-readable storage medium comprising instructions, which when executed by the processor device, cause the processor device to perform the method of the third aspect, including any example thereof. The technical benefits of the sixth aspect may largely correspond to those of the method of the third aspect, including any example thereof.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

For vehicles it is often desirable to reduce the total weight in order to save energy. Vehicle manufacturers therefore strive to use lighter components. When it comes to service brakes, there are alternatives to the relatively heavy steel brakes, namely in the form of relatively light carbon brakes. A disadvantage with carbon brakes, however, is that frequent brake events results in fast wear of the carbon brakes, as the wear of the carbon brake is primarily dependent on the total number of brake events. The wear of steel brakes on the other hand is generally proportional to the kinetic energy that they absorb. The inventors of the present disclosure have realized that by letting at least some of the traditional metallic brakes (such as steel brakes) be replaced by lighter non-metallic brakes (such as carbon brakes), not only will the weight be reduced and energy saved, but by selectively applying the different types of brakes depending on the type of brake event that is expected to occur, you can also reduce the wear of the respective brakes.

Figure 1:
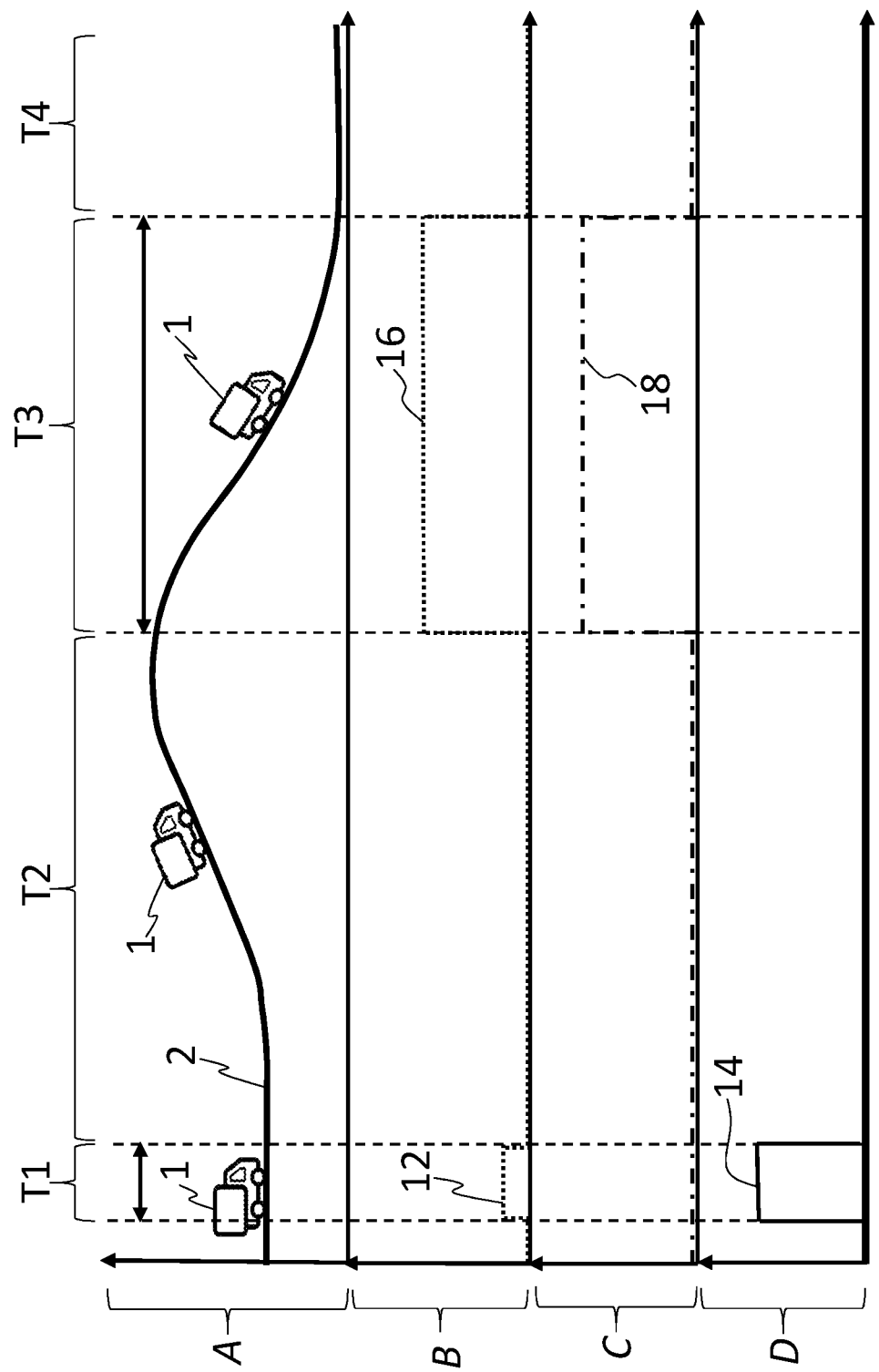
FIG. 1 is a schematic illustration of brake events in which teachings of the present disclosure is implemented.

FIG. 1 is a schematic illustration of brake events in which teachings of the present disclosure is implemented. FIG. 1 illustrates how a heavy-duty vehicle 1 is driving along a road. More specifically, FIG. 1 illustrates a road segment 2 of the road on which the vehicle 1 travels. As will be discussed in more detail below, when driving along the road the vehicle 1 will climb up a hill and then drive in a downhill slope. The vehicle 1 is illustrated as a truck, i.e. a type of heavy-duty vehicle, which requires relatively high braking power in downhill travel compared to lighter vehicles such as cars. The vehicle 1 may be operated by a driver. However, teachings of the present disclosure may also be implemented for an autonomous, i.e. self-driving, vehicle.

In more detail, the schematic diagram in FIG. 1 is divided into four horizontal sections. A first horizontal section A, at the top of the diagram, represents the topography of the road segment 2 of the road along which the vehicle travels. A second horizontal section B represents an expected value of kinetic energy that will be absorbed during upcoming brake events as the vehicle 1 travels along the road segment 2. A third horizontal section C represents brake power applied by non-metallic (e.g. carbon) brakes. A fourth horizontal section D, at the bottom of the diagram, represents brake power applied by metallic (e.g. steel) brakes.

The schematic diagram in FIG. 1 is also divided into four vertical sections T1-T4. The vehicle 1 has a processor device (not shown in FIG. 1, but will be discussed in relation to the other figures) which is configured to acquire prediction data. That prediction data may thus include information about the illustrated road segment 2 on which the vehicle 1 will travel. By having information about the upcoming road segment 2 the processor device can also anticipate brake events that will occur when the vehicle will drive along the road segment. The four vertical sections T1-T4 may, for instance, be considered to represent different time slots. The first vertical section T1 may represent the time during which the vehicle 1 will initially be travelling on a relatively flat part of the illustrated road segment 2. However, as will be explained below, the processor device may anticipates a brake event to occur in this section T1 even though it is relatively flat, for example due to a curve or due to reduced speed limit. Next, in the second vertical section T2, the vehicle 1 will climb up a hill up to a crest. In the third vertical section T3, as the vehicle 1 has passed the crest, it will travel along the downhill slope. Finally, in the fourth vertical section T4, when the vehicle 1 has left the downhill slope it will once again travel on a substantially flat part of the illustrated road segment.

Figure 2:
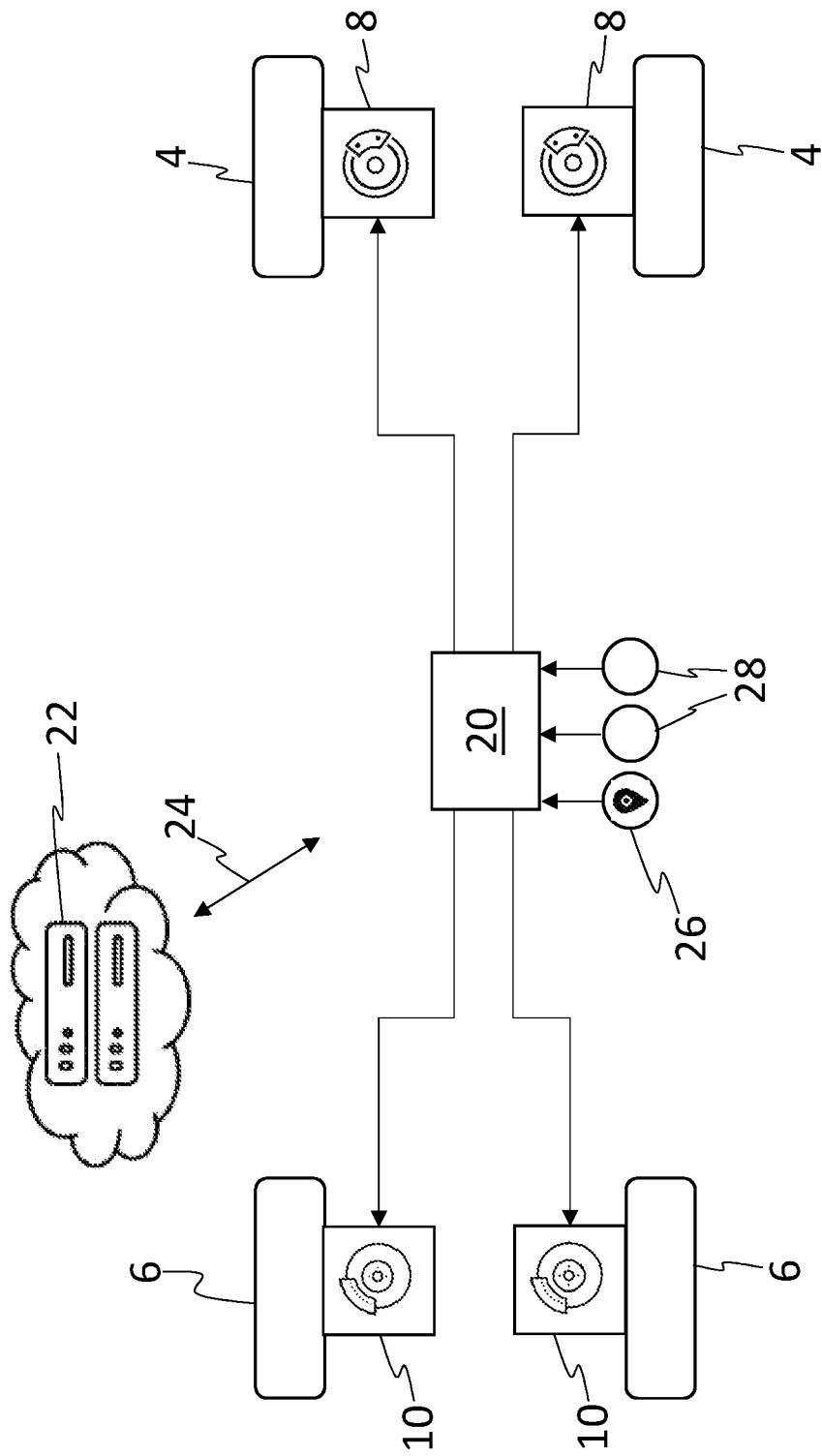
FIG. 2 is a schematic illustration of parts of a heavy-duty vehicle for implementing teachings of the present disclosure.

Turning now to FIG. 2, there is presented a schematic illustration of parts of a heavy-duty vehicle (such as the vehicle in FIG. 1) for implementing teachings of the present disclosure. FIG. 2 illustrates that the vehicle has four wheels, two front wheels 4 and two rear wheel 6. However, the teachings of the present disclosure may be implemented for vehicles having more than four wheels as well, such as six wheels, eight wheels, etc. Brakes are provided for each wheel. A first set of brakes 8, in the form of metallic brakes 8, are provided at the pair of front wheels 4 and may be actuated to provide braking power to the front wheels 4. A second set of brakes 10, in the form of non-metallic brakes 10, are provided at the pair of rear wheels 6 and may be actuated to provide braking power to the rear wheels 6. Each non-metallic brake 10 has a lower weight than each metallic brake 8. FIG. 2 also illustrates a processor device 20. The processor device 20 is configured to acquire prediction data indicative of an upcoming brake event that is expected to occur along a road on which the vehicle is travelling. FIG. 2 illustrates two different examples of how the processor device 20 may acquire said prediction data. In one example, the prediction data may be received wirelessly from a remote server 22, e.g. via telematics communication 24 between the vehicle and the remote server 22. The vehicle may share its geographic position (e.g. using a local GIS module 26 on the vehicle) to the remote server 22, which in turn may respond with topographic data including upcoming variations in altitude, grades, etc. of the upcoming road segment. Said prediction data may also include historical numbers, such as actual brake power/energy applied by the vehicle during previous brake events on the same road. Another example, is that the local GIS module 26 of the vehicle itself may have such prediction data (e.g. including topographic and/or historical data) available and may provide it to the processor device 20.

Based on the prediction data, the processor device 20 may determine an expected value of kinetic energy that will be absorbed during the upcoming brake event. Based on the determined expected value of kinetic energy, the processor device 20 may select which one of the first (metallic) set of brakes 8 and second (non-metallic) set of brakes 10 that is to be activated to absorb kinetic energy during said upcoming brake event. The processor device 20 is configured to then control the selected set of brakes to be activated during said brake event, wherein the other set of brakes remains inactivated during said brake event. A more detailed example of this will now be discussed in connection with FIG. 1.

Thus, turning back to FIG. 1, the vehicle 1 is cruising along a road, and the processor device (such as processor device 20 in FIG. 2) is continuously or repeatedly provided with look-ahead information about the road ahead. Before the vehicle 1 has reached the illustrated road segment 2, the processor device has acquired prediction data which indicates that there will be two brake events in the illustrated road segment 2. A first brake event is expected to occur in the beginning of the illustrated road segment 2, at T1, while a second brake event is expected to occur further down the illustrated road segment 2, at T3. The first brake event may, for example, be anticipated due to a curve or due to a lowered speed limit. As illustrated by the first raised part 12 of the dotted line in the horizontal section B, this first brake event during T1 is expected to require relatively low kinetic energy to be absorbed. Therefore, the processor device determines that for this first brake event, the first set of brakes (metallic brakes) should be actuated, as illustrated by raised line 14 in the horizontal section D, showing a braking power to be applied by the first set of brakes. Since the first brake event is a relatively short brake event, requiring low brake energy, it means that even if the applied braking power might be relatively high, the absorbed kinetic energy will be relatively low because of the short duration (energy equals power multiplied by time duration). During T1, the second set of brakes (non-metallic brakes) remain inactive as illustrated in the horizontal section C. Since the wear of metallic brakes are generally proportional to the absorbed kinetic energy, it is advantageous to use them during this first (low energy) brake event at T1; and since the wear of non-metallic brakes are mainly effected by the number of brake events, avoiding using them in this first (low energy) brake event reduces the number of activations of the non-metallic brakes and thus the wear.

During the uphill climb, at T2, no brake event is anticipated. However, for the ensuing downhill slope, at T3, the processor device expects that a high energy level will need to be absorbed, as indicated by the highly elevated part 16 of the dotted line in horizontal section B. Modern long haul vehicles often travel in cruise control mode, so the processor device may in such case determine an expected value of kinetic energy that needs to be absorbed to maintain the cruising speed along the downhill slope, i.e. avoiding acceleration of the vehicle. More specifically, the processor device may suitably determine the braking power that will be needed to maintain the cruising speed of the vehicle 1 along the entire downhill slope. Having determined the braking power that will be needed, and knowing the speed of the vehicle and the length of the downhill slope, the processor device can determine the duration of T3 and thus the brake energy that will be required. Since the second brake event is expected to require relatively high kinetic energy to be absorbed during T3, the processor device determines that for this second brake event, the second set of brakes (non-metallic brakes) should be actuated, as illustrated by the raised dashed-dotted line 18 in the horizontal section C, showing a braking power to be applied by the second set of brakes. During T3, the first set of brakes (metallic brakes) remain inactive as illustrated by in the horizontal section D. Thus, high brake energy absorption by the metallic brakes is avoided, therefore avoiding premature wear of metallic brakes.

Turning back to FIG. 2, there is schematically indicated that a plurality of input devices 28 (only two illustrated, but there may be many more). The input devices 28 may be in operative communication with the processor device 20. Such input devices 28 may include various types of sensors, such as speed sensor, load sensor, acceleration sensors, keyboard, etc. For instance, having information about the total weight of the vehicle, including the load it is carrying, the brake power required in a downhill slope may be calculated. As explained previously, having information about the grade of the downhill slope and the weight of the vehicle, the standard acceleration formula may be used in determining what brake power should be applied to avoid acceleration and to let the vehicle travel at or below a set cruising speed of the vehicle.

Figure 3:
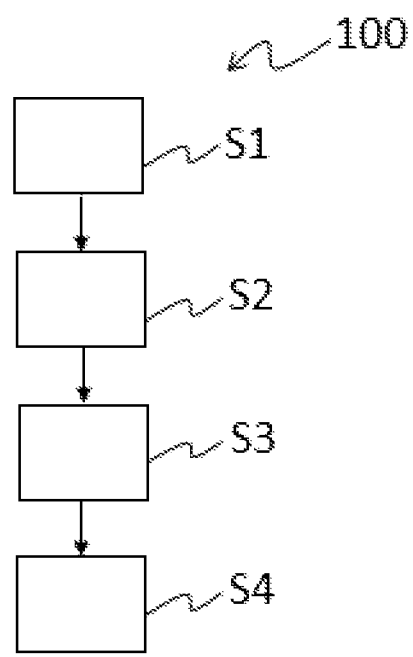
FIG. 3 is a schematic illustration of acts included in the method of the disclosure, in accordance with at least one example.

FIG. 3 is a schematic illustration of acts included in the method of the disclosure, in accordance with at least one example. More specifically, FIG. 3 illustrates a computer-implemented method 100, comprising:

in a step S1, acquiring, by a processor device of a computer system, prediction data indicative of an upcoming brake event that is expected to occur along a road on which a heavy-duty vehicle is travelling, in a step S2, determining, by the processor device, based on the prediction data, an expected value of kinetic energy that will be absorbed during said upcoming brake event, in a step S3, selecting, by the processor device, based on said determined expected value of kinetic energy, which one of a first set of brakes and a second set of brakes of the heavy-duty vehicle that is to be activated to absorb kinetic energy during said upcoming brake event, wherein the brakes of the first set are metallic brakes and the brakes of the second set are non-metallic brakes, and in a step S4, controlling, by the processor device, the selected set of brakes to be activated during said brake event, wherein the other set of brakes remains inactivated during said brake event.

Figure 4:
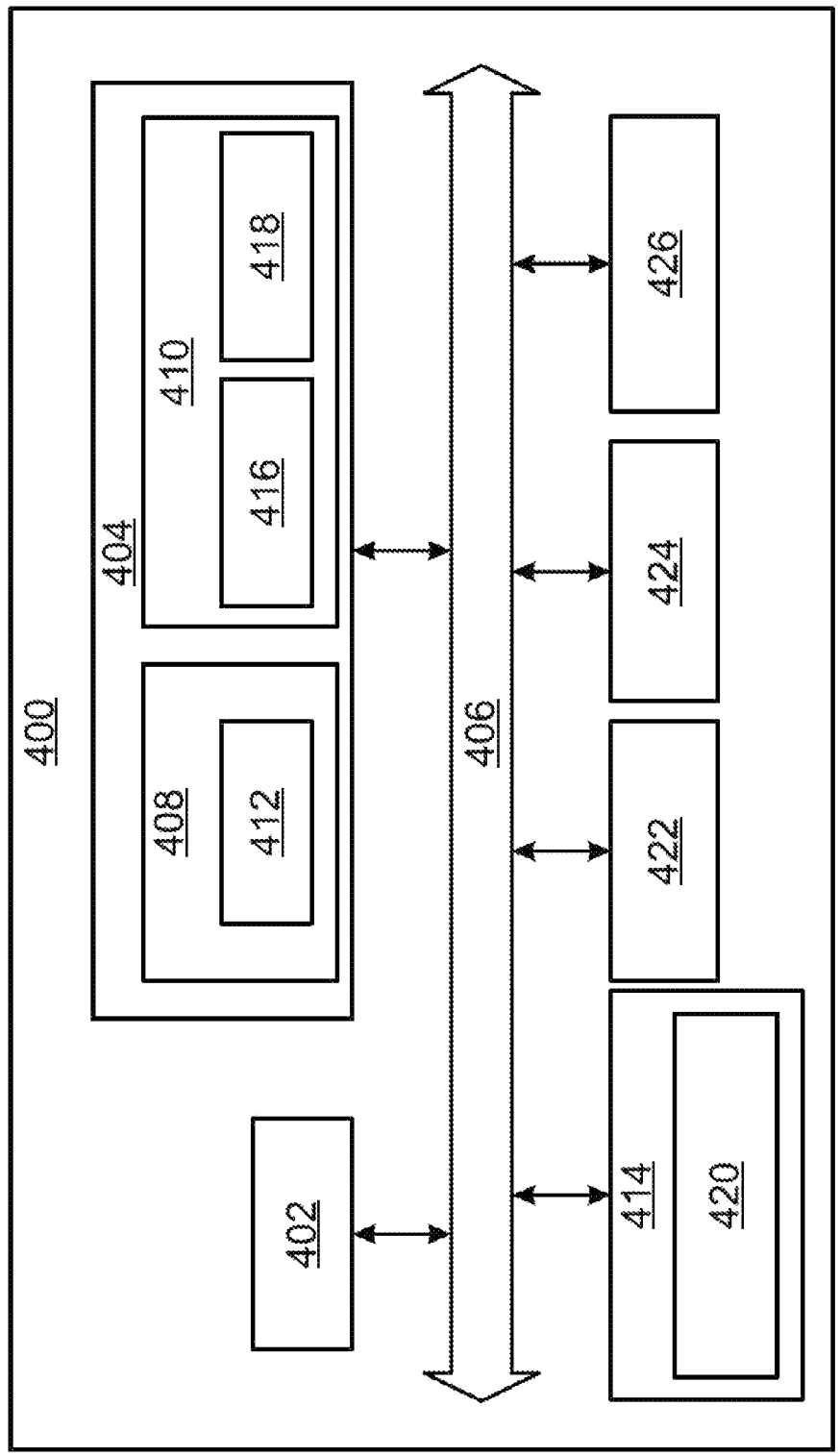
FIG. 4 is a schematic diagram of an exemplary computer system for implementing examples disclosed herein, according to one example.

FIG. 4 is a schematic diagram of an exemplary computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include a processor device 402, such as corresponding to the processor device 20 in FIG. 2 (may also be referred to as a control unit), a memory 404, and a system bus 406. The computer system 400 may include at least one computing device having the processor device 402. The system bus 406 provides an interface for system components including, but not limited to, the memory 404 and the processor device 402. The processor device 402 may include any number of hardware components for conducting data or signal processing or for executing computer code stored in memory 404. The processor device 402 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data (for example historical data as previously discussed herein) and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processor device 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a processor device 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 stored on a transitory or non-transitory computer-usable or computer-readable storage medium (e.g., single medium or multiple media), such as the storage device 414, which includes complex programming instructions (e.g., complex computer-readable program code) to cause the processor device 402 to carry out the steps described herein. Thus, the computer-readable program code can comprise software instructions for implementing the functionality of the examples described herein when executed by the processor device 402. The processor device 402 may serve as a controller or control system for the computer system 400 that is to implement the functionality described herein.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Figure 5:
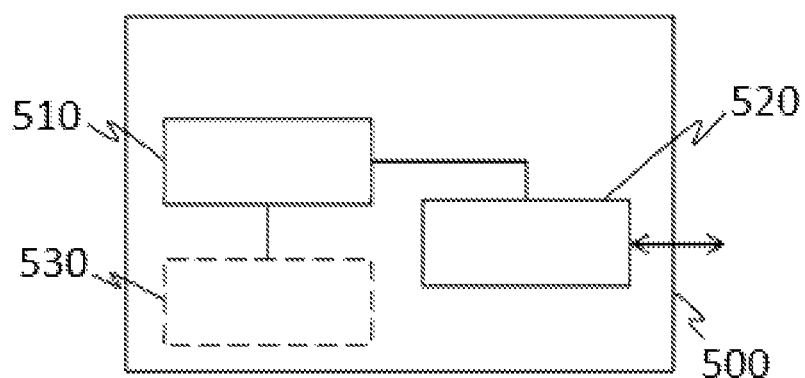
FIG. 5 schematically illustrates a processor device according to one example.

FIG. 5 schematically illustrates a processor device 500 according to at least one exemplary embodiment of the present disclosure. The processor device 500 in FIG. 5 may, for instance, correspond to the processor device 402 in FIG. 4 or the processor device 20 in FIG. 2. FIG. 5 illustrates, in terms of a number of functional units, the components of a processor device 500 according to exemplary embodiments of the discussions herein. The processor device 500 may be comprised in any working machine disclosed herein, thus in the form of an on-board processor device 500, or as it may be comprised in a remote facility, such as in an office or in a cloud-based solution as discussed herein. Processing circuitry 510 may be provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the processor device 500 to perform a set of operations, or steps, such as the method discussed in connection to FIG. 3 and others examples discussed throughout this disclosure. For example, the storage medium 530 may store the set of operations, and the processing circuitry 510 may be configured to retrieve the set of operations from the storage medium 530 to cause the processor device 500 to perform the set of operations. The set of operations may be provided as a set of executable instructions. Thus, the processing circuitry 510 is thereby arranged to execute exemplary methods as herein disclosed.

The storage medium 530 may also comprise persistent storage, which, for example may be any single one or combination of magnetic memory, optical memory, solid state memory or even remotely mounted memory.

The processor device 500 may further comprise an interface 520 for communications with at least one external device such as load sensor, speed sensor, GPS system, telematics network, etc. As such, the interface 520 may comprise one or more transmitters and receivers, comprising analogue and digital components and a suitable number of ports for wireline or wireless communication.

The processing circuitry 510 controls the general operation of the processor device 500, e.g. by sending data and control signals to the interface 520 and the storage medium 530, by receiving data and reports from the interface 520, and by retrieving data and instructions form the storage medium 530. Other components, as well as the related functionality, of the processor device 500 are omitted in order not to obscure the concepts presented herein.

Figure 6:
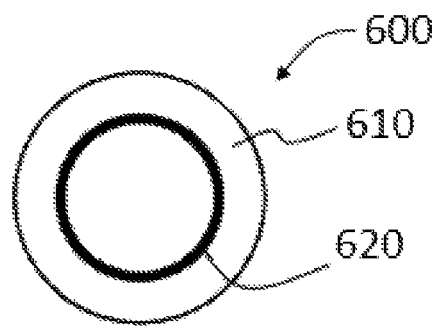
FIG. 6 schematically illustrates a computer program product according to one example.

FIG. 6 schematically illustrates a computer program product 600 according to one example. More specifically, FIG. 6 illustrates a non-transitory computer-readable storage medium 610 carrying a computer program comprising program code means 620 for performing the methods exemplified in FIG. 3 and any examples thereof, when executed by the processor device. The computer-readable storage medium 610 and the program code means 620 may together form the computer program product 600.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A heavy-duty vehicle, comprising:
a first set of brakes,
a second set of brakes,
wherein the brakes of the first set are metallic brakes,
wherein the brakes of the second set are non-metallic brakes, wherein each non-metallic brake of the second set has a lower weight than each metallic brake of the first set,
a processor device which is configured to:
acquire prediction data indicative of an upcoming brake event that is expected to occur along a road on which the vehicle is travelling,
determine, based on the prediction data, an expected value of kinetic energy that will be absorbed during said upcoming brake event,
select, based on said determined expected value of kinetic energy, which one of the first and second sets of brakes that is to be activated to absorb kinetic energy during said upcoming brake event, and
control the selected set of brakes to be activated during said brake event, wherein the other set of brakes remains inactivated during said brake event.

2. The heavy-duty vehicle of claim 1, wherein the metallic brakes are steel brakes, wherein the non-metallic brakes are carbon brakes.

3. The heavy-duty vehicle of claim 1, wherein the first set of brakes are provided on a first set of wheels, wherein the second set of brakes are provided on a second set of wheels.

4. The heavy-duty vehicle of claim 1, wherein the processor device is configured to compare said determined expected value of kinetic energy with a predetermined energy threshold value, wherein upon determination by the processor device that said determined expected value is higher than the predetermined energy threshold value, then the processor device selects the second set of brakes, and upon determination by the processor device that said determined expected value is lower than the predetermined energy threshold value then the processor device selects the first set of brakes.

5. The heavy-duty vehicle of claim 1, wherein said prediction data comprises stored historical driving data representing previous brake actions, wherein the processor device is configured to access said stored historical data, and based on said stored historical data, determine said expected value of kinetic energy that will be absorbed during said upcoming brake event.

6. The heavy-duty vehicle of claim 1, wherein said prediction data comprises information about the topography of an upcoming road segment, wherein the processor device is configured to determine said expected value of kinetic energy based on said information about the topography.

7. The heavy-duty vehicle of claim 6, wherein said information about the topography comprises information about a length and/or a grade of an upcoming downhill slope.

8. The heavy-duty vehicle of claim 1, wherein the processor device is configured to determine said expected value of kinetic energy based on one or more of the following parameters:
an expected time duration of the upcoming brake event,
an expected distance that will be travelled by the vehicle during the upcoming brake event,
a grade of the road segment at which the upcoming brake event is expected to occur, the current vehicle speed.

9. The heavy-duty vehicle of claim 1, wherein said determining, by the processor device, of the expected value of kinetic energy, comprises determining how much brake power that needs to be applied during the upcoming brake event to maintain the current vehicle speed.

10. The heavy-duty vehicle of claim 1, wherein said upcoming brake event is a first brake event, wherein the said prediction data is also indicative of a plurality of subsequent brake events that are expected to occur along a road on which the vehicle is travelling, wherein the processor device is configured to:
determine, based on the prediction data, for each one of said plurality of subsequent brake events, a respective expected value of kinetic energy that will be absorbed during that subsequent brake event,
select for each one of said subsequent brake events, based on said determined respective expected value of kinetic energy, which one of the first and second sets of brakes that is to be activated to absorb kinetic energy during that subsequent brake event, and
control the selected set of brakes to be activated during that subsequent brake event, wherein the other set of brakes remains inactivated during that subsequent brake event.

11. A computer system comprising a processor device configured to:
acquire prediction data indicative of an upcoming brake event that is expected to occur along a road on which a heavy-duty vehicle is travelling,
determine, based on the prediction data, an expected value of kinetic energy that will be absorbed during said upcoming brake event,
select, based on said determined expected value of kinetic energy, which one of a first set of brakes and a second set of brakes of the heavy-duty vehicle that is to be activated to absorb kinetic energy during said upcoming brake event, wherein the brakes of the first set are metallic brakes and the brakes of the second set are non-metallic brakes, and
control the selected set of brakes to be activated during said brake event, wherein the other set of brakes remains inactivated during said brake event.

12. A computer-implemented method, comprising:
acquiring, by a processor device of a computer system, prediction data indicative of an upcoming brake event that is expected to occur along a road on which a heavy-duty vehicle is travelling,
determining, by the processor device, based on the prediction data, an expected value of kinetic energy that will be absorbed during said upcoming brake event,
selecting, by the processor device, based on said determined expected value of kinetic energy, which one of a first set of brakes and a second set of brakes of the heavy-duty vehicle that is to be activated to absorb kinetic energy during said upcoming brake event, wherein the brakes of the first set are metallic brakes and the brakes of the second set are non-metallic brakes, and
controlling, by the processor device, the selected set of brakes to be activated during said brake event, wherein the other set of brakes remains inactivated during said brake event.

13. A computer program product comprising program code for performing, when executed by the processor device, the method of claim 12.

14. A control system comprising one or more control units configured to perform the method of claim 12.

15. A non-transitory computer-readable storage medium comprising instructions, which when executed by the processor device, cause the processor device to perform the method of claim 12.

* * * * *